United States Patent [19]

Worbois

[11] Patent Number: 4,577,910
[45] Date of Patent: Mar. 25, 1986

[54] QUICK RELEASE VALVE ARRANGEMENT

[75] Inventor: Robert J. Worbois, North Huntingdon, Pa.

[73] Assignee: American Standard Inc., Wilmerding, Pa.

[21] Appl. No.: 607,061

[22] Filed: May 4, 1984

[51] Int. Cl.⁴ .............................................. B60T 15/32
[52] U.S. Cl. .......................................... 303/69; 303/80
[58] Field of Search ................... 303/69, 70, 75, 37, 303/14, 81, 80; 188/33

[56] References Cited

U.S. PATENT DOCUMENTS 2,937,906  5/1960  May .................................. 303/69 X

FOREIGN PATENT DOCUMENTS 1403459  10/1975  United Kingdom .................. 303/70

OTHER PUBLICATIONS

N.Y.A.B. Brochure, "The New ABDL Control Valve for Freight Locomotives".

Primary Examiner—Bruce H. Stoner, Jr.
Assistant Examiner—Robert J. Oberleitner
Attorney, Agent, or Firm—G. J. Falce

[57] ABSTRACT

A quick release valve for releasing the locomotive automatic brake independently of the train brakes when an AB/D type freight brake control valve is used on the locomotive. A release valve normally establishes a fluid control passage between the control valve and a relay valve that controls the locomotive brake pressure. When a quick release is made, the release valve is actuated to interrupt this fluid control passage and exhaust the relay valve portion of the passage to release the brakes. At the same time, a dissipation valve is effective to exhaust auxiliary reservoir pressure. If the quick release is made of a service application, the exhaust of auxiliary reservoir pressure will cause the control valve to exhaust the control valve portion of the control line and thereby prevent an automatic reapplication of the automatic brake following termination of the quick release function. The exhaust of control line pressure also causes the dissipation valve to reset to terminate further exhaust of auxiliary reservoir pressure, which is thus available in the event a further application of the automatic brake is desired. If the quick release is made of an emergency application, the exhaust of auxiliary reservoir pressure will have no influence on the control valve, since the brake pipe pressure will be completely exhausted, thus assuring a reapplication of the emergency brake following termination of the quick release operation.

13 Claims, 3 Drawing Figures

QUICK RELEASE VALVE ARRANGEMENT

BACKGROUND OF THE INVENTION

The present invention relates to railway train brake apparatus and, in particular, to brake apparatus for releasing an automatic brake application at the locomotive independently of the cars of the train.

In present practice, the locomotive air brake system employs a control valve device capable of being selectively conditioned for either direct release type operation, as required when the locomotive is used in a freight train, or a graduated release type operation, as required when the locomotive is being employed in a passenger train. In addition, this control valve is provided with a quick release valve to release the control valve initiated automatic brake application on the locomotive independently of the car brakes. The quick release valve is actuated by depressing the locomotive independent brake valve handle. Since the locomotive automatic and straight air brake systems are connected to the brake cylinder relay valve through a double check valve, the automatic air brake is only released to a value corresponding to the position of the independent brake valve handle in the zone of application. A description of the foregoing locomotive air brake system devices and the system operation may be found in WABCO instruction pamphlet G-g-5071-6 entitled "26 Type Brake Equipment for Locomotive". This locomotive brake equipment is conventional and well-known to those in the railroad industry.

It has been proposed to substitute for the conventional locomotive control valve a freight car control valve, such as the conventional AB/D type control valve, when the locomotive is to be used strictly in a freight train. Since the AB/D type control valve is considerably less complex than the 26 type control valve traditionally employed on locomotives, a considerable cost savings can be realized. However, the conventional AB/D type control valve has no means for providing the independent release of the locomotive automatic air brake. Moreover, the conventional AB/D type control valve operates on the pressure equalization principle which differs from the proportioning principle on which operation of the 26 type control valve is based, thus precluding use of the conventional quick release valve with the AB/D type control valve.

SUMMARY OF THE INVENTION

It is, therefore, the object of the invention to provide a new quick release which can be used with a more economical locomotive type control valve, the operation of which is predicated on the pressure equalization principle in order to obtain a release of the automatic air brake on the locomotive independently of the car brakes.

It is another object of the invention to provide a new quick release valve, in accordance with the foregoing object, that will prevent an automatic reapplication of the locomotive automatic air brake following an independent quick release of a service brake application.

It is still another object of the invention to provide a new quick release valve that will permit further application of the locomotive automatic air brake in the event a further increase in braking is desired.

It is a final object of the invention to provide a new quick release valve that will assure an automatic reapplication of the locomotive automatic brake following an independent quick release of an emergency brake application.

These objectives are carried out by piping the brake cylinder line from the locomotive control valve to the brake cylinder relay valve via a release valve that is actuated in response to pressurization of the locomotive actuating pipe when the locomotive independent brake valve handle is depressed by the engineer. Fluid pressure communication between the control valve and relay valve via the brake cylinder line is interrupted when the release valve is actuated, with the relay valve segment of the brake cylinder line being exhausted to release the automatic brake on the locomotive and the control valve segment of the brake cylinder line being connected to the actuating chamber of a dissipation valve. Auxiliary reservoir pressure is vented to atmosphere when the dissipation valve is actuated to cause the control valve to move to its release position in which the control valve segment of the brake cylinder line is also connected to atmosphere. When this occurs, the actuating pressure at the dissipation valve is exhausted to allow the dissipation valve to reset and terminate the venting of auxiliary reservoir pressure. This assures that only sufficient auxiliary reservoir pressure is exhausted to set the control valve to its release position, so that a further brake application may be made. Now, when the independent brake valve handle is released, after a relatively brief period of time to allow the aforementioned operation to take place, the release valve resets to its normal position in which fluid pressure communication in the brake cylinder line between the control valve and relay valve is reestablished. Since the control valve is in its release position to maintain the brake cylinder line vented, however, an undesired reapplication of the locomotive brakes is prevented.

A pressure limiting check valve is provided to retain a predetermined auxiliary reservoir pressure when the auxiliary reservoir pressure is vented to atmosphere via the dissipation valve, so that following an independent quick release of an emergency brake application on the locomotive, the brakes will automatically reapply at a value corresponding to the retained auxiliary reservoir pressure.

BRIEF DESCRIPTION OF THE DRAWINGS

These and other objects and attendant advantages of the invention will become apparent from the following more detailed explanation when taken with the drawings, in which.

DESCRIPTION AND OPERATION

Figure 1:
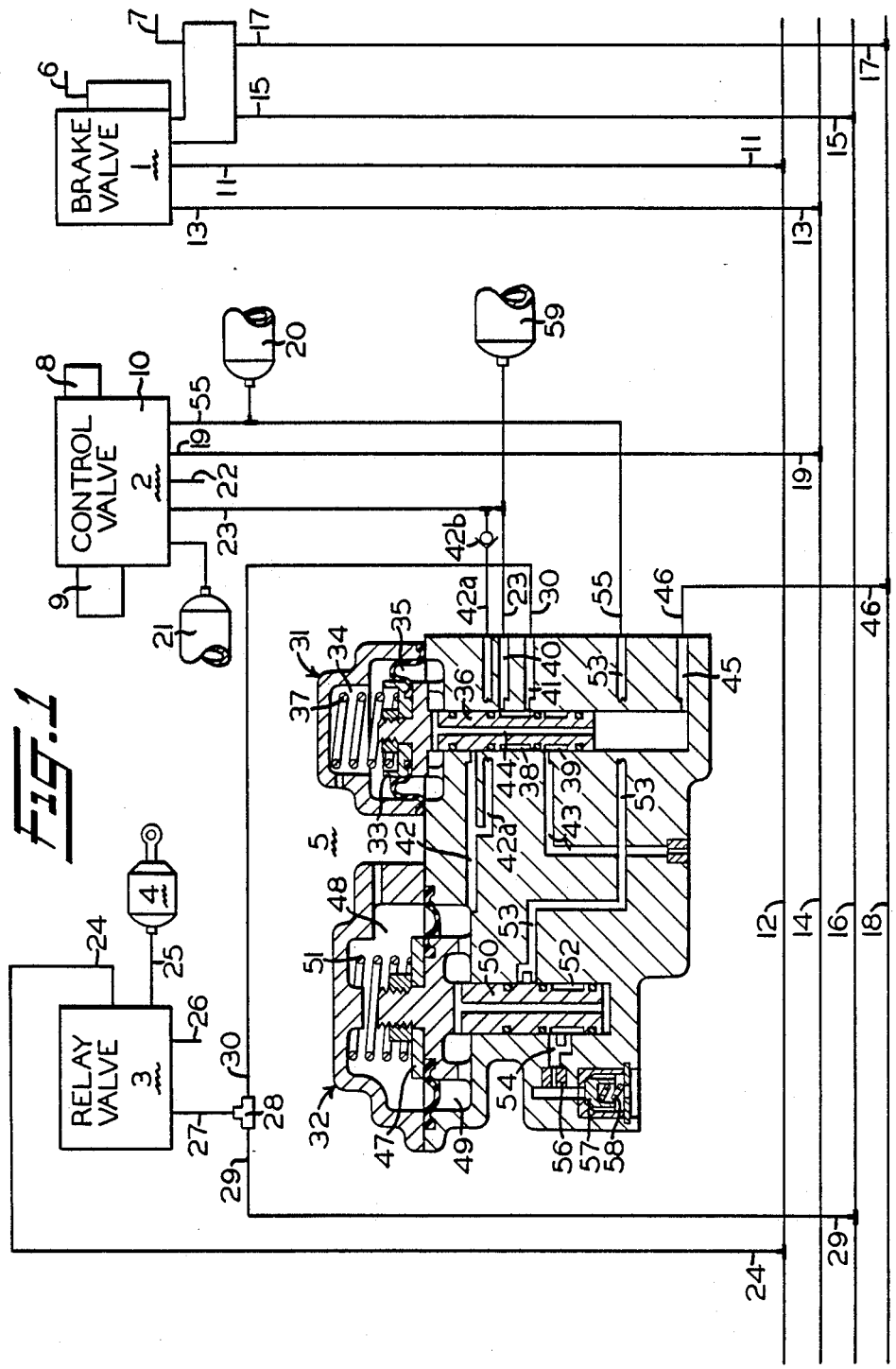
FIG. 1 is a piping schematic of a locomotive brake system showing one embodiment of the quick release valve device of the present invention in diagrammatic form.

Referring to the embodiment of FIG. 1, there is shown a locomotive brake equipment including a locomotive brake valve device 1, such as a conventional 26-C brake valve; a control valve device 2, such as a conventional AB/D control valve; a brake relay valve 3, such as a conventional J-1 relay valve; a brake cylinder device 4, such as any of the conventional, well-known brake cylinders normally employed to produce the desired locomotive brake forces; and a novel quick release valve device 5.

As is well-known, brake valve device 1 includes an automatic brake valve handle 6 for controlling the automatic brakes on the locomotive, as well as the cars of the train, and an independent brake valve handle 7 for controlling the straight air brakes on the locomotive independently of the automatic brakes and for controlling the release of the automatic brake application on the locomotive independently of the brakes on the cars of the train. As is also well-known, the AB/D type control valve device 2 operates on the pressure equalization principle, and has long been the industry standard for car freight brake service in countries employing direct release type brake control. This control valve device 2 comprises a service portion 8 and an emergency portion 9 mounted on a pipe bracket portion 10.

Also well-known is the brake relay valve device 3, which is a self-lapping or proportioning-type valve having the capability of maintaining the brake cylinder pressure against leakage.

Connected to brake valve device 1 is a branch line 11 of a main reservoir pipe 12 that provides a source of pneumatic pressure to the locomotive from a main reservoir (not shown) which is supplied by a compressor (not shown) so as to maintain the source of pneumatic pressure within a desired pressure range. This main reservoir pressure is connected by a branch line 13 to a brake pipe 14 that passes through the locomotive and train when the automatic brake valve handle 6 is in a release position. Rotation of handle 6 through the zone of application to full service position exhausts brake pipe pressure in proportion to the degree of handle rotation to provide service brake control of the automatic brake. Emergency operation of the automatic brake is initiated by movement of handle 6 into emergency position, whereby the pressure in brake pipe 14 is completely exhausted.

This main reservoir pressure may also be supplied to and released from a branch line 15 leading to the locomotive independent application and release pipe 16 in proportion to the degree of rotation of the independent brake valve handle between application and release position on the handle quadrant. Full main reservoir pressure at brake valve device 1 may also be connected to a branch line 17 of the locomotive actuating pipe 18 by depressing the independent brake valve handle 7 and may be subsequently exhausted by releasing handle 7.

Another branch line 19 of brake pipe 14 is connected to pipe bracket 10 of control valve device 2, whereby the control valve device is operative in response to an increase in brake pipe pressure to establish internal connections via which an auxiliary reservoir 20 and an emergency reservoir 21 are charged from the brake pipe 14. Also connected to the pipe bracket 10 is an exhaust line 22 leading to atmosphere and a brake cylinder pilot line 23.

Another branch line 24 of main reservoir pipe 12 is connected to relay valve device 3 which operates to supply air to brake cylinder device 4 via a line 25 and to exhaust air from the brake cylinder via a line 26 leading to atmosphere. A control line 27 is connected between relay valve device 3 and the output of a double check valve 28. Double check valve 28 establishes fluid pressure communication between the higher of two pressures at its opposing inlets the control line 27 for control of relay valve device 3. Connected to one inlet of double check valve 28 is a branch line 29 of independent application and release pipe 16 and connected to the other inlet is a brake cylinder pilot line 30. Line 29 conducts pneumatic control pressure during operation of the independent straight air brake and line 30 conducts pneumatic control pressure during operation of the automatic brake.

Quick release valve device 5 comprises a release valve 31, a dissipation valve 32 and a retention check valve 57. Release valve 31 is formed by a diaphragm piston 33 having an atmospheric chamber 34 on one side and a pressure chamber 35 on the opposite side. A spool valve 36 is operated by piston 33, which is urged toward its normal, deactuated position, as shown, by a return spring 37 in atmospheric chamber 34.

Formed in spool 36 are a pair of axially-spaced, annular grooves 38 and 39, which control communication between a pair of internal passages 40 and 41 to which the respective brake cylinder pilot lines 23 and 30 are connected, and internal passages 42 and 43. Also connected to brake cylinder pilot line 23 is a displacement reservoir 59 having a volume corresponding to the volume of a standard sized brake cylinder in order to maintain the proper equalization of pressures between auxiliary reservoir 20 and brake cylinder pilot line 23 upon which proper operation of control valve device 2 is based. Passage 42 is connected to pilot line 23 in parallel with another passage 42a having a one-way check valve 42b. A central passage 44 in spool 36 communicates pressure chamber 35 with an internal passage 45 to which a branch line 46 of actuating pipe 18 is connected.

Dissipation valve 32 is formed by a diaphragm piston 47 having an atmospheric chamber 48 on one side and a pressure chamber 49 on the opposite side. A spool valve 50 is operated by piston 47, which is urged toward its normal, deactuated position, as shown, by a return spring 51 in atmospheric chamber 48. Formed in spool 50 is an annular groove 52, which controls communication between a pair of internal passages 53 and 54. Passage 53 is connected to a line 55 leading to auxiliary reservoir 20, while passage 54 is connected to atmosphere via a choke 56 and the retention check valve 57. A spring 58 of check valve 57 biases the check valve in a closed direction.

When an automatic service brake application is desired, the automatic brake valve handle 6 is moved out of release position into the application zone to effect a reduction of brake pipe pressure throughout the train. At the locomotive, the service portion 8 of control valve device 2 responds to the pressure differential created between the auxiliary reservoir 20 and brake pipe 14 resulting from the brake pipe pressure reduction. Accordingly, auxiliary reservoir pressure is connected to brake cylinder pilot line 23 and displacement reservoir 59 until the pressure in the auxiliary reservoir is reduced slightly below the brake pipe pressure selected in accordance with the position of brake valve handle 6, at which point equalizing reservoir pressure is cut off from line 23. This pilot pressure in brake cylinder line 23 is connected to relay valve device 3 via passage 40, groove 38 of spool valve 36, passage 41, brake cylinder pilot line 30, double check valve 28 and control line 27, it being assumed that pressure is absent or less than the pressure in line 30 at double check valve 28. Accordingly, relay valve 3 is operated to connect main reservoir supply pressure from branch line 24 of main reservoir pipe 12 to line 25 and brake cylinder 4 until the developed brake cylinder pressure corresponds to the pressure at control line 27.

In the event the train engineer desires to release this automatic service brake application on the locomotive without concurrently releasing the train brakes, the independent brake valve handle 7 is momentarily depressed to connect main reservoir pressure from main reservoir pipe 12 and branch line 11 to chamber 35 of release valve 31 via main reservoir pipe 12, branch line 13, brake valve device 1, branch line 17, actuating pipe 18, branch line 46, passage 45, and central passage 44. Consequently, piston 35 is forced upwardly against return spring 37 to its actuated position. In this position, annular groove 39 connects passage 41 to passage 43, thereby venting brake cylinder pilot line 30 and control line 27. Relay valve 3 thus operates to exhaust the pressure in brake cylinder device 4 via passages 25 and 26.

It will be understood that if any pressure exists in independent application and release line 16 and branch line 29, due to the independent brake valve handle 7 being rotated into the application zone at the time the handle is depressed to release the automatic brake, as above explained, the pressure in control line 27 will only be reduced to the pressure existing in line 29. Therefore, the pressure in brake cylinder 4 will only be reduced to the value called for by the independent brake.

Concurrently, annular spool groove 38 of release valve 31 connects passage 40 to passage 42, whereby chamber 49 under piston 47 is pressurized to force the piston 47 and spool 50 of dissipation valve 32 upwardly to its actuated position against the force of return spring 51. In this actuated position of dissipation valve 32, annular spool groove 52 connects passage 53 to passage 54, thereby connecting auxiliary reservoir pressure to atmosphere via choke 56 and retention check valve 57. The resultant reduction of auxiliary pressure creates a pressure differential between the brake pipe and auxiliary reservoir 20 to cause the service portion 8 of control valve 2 to assume a release condition in which line 23 is connected to exhause line 22. Accordingly, the actuating pressure in chamber 49 of dissipation valve 32 is exhausted via passages 42 and 40 that are connected via the release valve spool 36 to allow return spring 51 to reset piston 47 to its normal position in which annular groove 52 interrupts further exhausting of auxiliary reservoir pressure. Thus, the dissipation valve 32 is actuated only until auxiliary reservoir pressure has been reduced below brake pipe pressure sufficiently to condition the service valve portion of control valve device 2 for release of the brakes. Therefore, when the independent brake valve handle 7 is subsequently released following momentary depression of the handle to effect the above-explained quick release of the automatic brake, actuating pressure in chamber 15 will be exhausted via central passage 44, branch line 46 and actuating pipe 18 to allow return spring 37 to reset the release valve piston 33 and spool 36. In this reset position, annular grooves 38 and 39 in spool 36 isolate the respective passages 42 and 43, while spool groove 38 concurrently reestablishes fluid pressure communication between passages 41 and 40. Accordingly, the relay valve 3 is reconnected to control valve device 2 via brake cylinder pilot lines 23 and 30, but since line 23 is connected to atmosphere via exhause line 22, no automatic brake control pressure is connected to double check valve 28 and the automatic brake is thus prevented from being automatically reapplied when the quick release operation is terminated.

In the event a further service brake pipe reduction is made, however, by operation of brake valve handle 6, for example, a pressure differential will again be created between the brake pipe and auxiliary reservoir pressures to cause the service portion to assume an application condition in which the auxiliary reservoir pressure is connected to brake cylinder pilot line 23 and relay valve 3 is in turn operated to apply the automatic brake.

In the event an emergency brake application is made by operating the automatic brake valve handle 6 to emergency position to effect an emergency rate of reduction of brake pipe pressure, emergency portion 9 of control valve device 2 will be operated in conjunction with service portion 8 whereby both the auxiliary reservoir 20 and the emergency reservoir 21 are connected to brake cylinder pilot line 23 in the usual, well-known manner, and thence via pilot line 30 and control line 27 to relay valve device 3 to obtain brake pressure at brake cylinder 4 corresponding to an emergency application of the automatic brake.

While the quick release operation of this emergency application of the automatic brake is accomplished in the same manner as explained for a service brake application, the emergency brake application is reapplied automatically if the independent brake valve handle 7 is subsequently released, since the complete exhaust of brake pipe pressure prevents the service valve portion 8 of control valve device 2 from assuming a release condition in response to the auxiliary reservoir reduction that occurs when dissipation valve 32 is actuated. Thus, when release valve 31 is reset and brake cylinder pilot lines 23 and 30 are reconnected, the emergency brake pressure existing in line 23 and displacement reservoir 59 is effective to operate relay valve 3 and automatically reapply brake pressure to brake cylinder 4.

It should be understood, however, that since service portion 8 of control valve device 2 does not assume a release condition following an emergency application, actuating pressure in control chamber 49 of dissipation valve 32 remains trapped to prevent the dissipation valve from resetting, as during quick release of a service application. Consequently, retention check valve 57 is set by its bias spring 58 to retain sufficient pressure in auxiliary reservoir 20 and thus in interconnected emergency reservoir 21 to assure an automatic reapplication of the release automatic brake immediately upon release of the depressed independent brake valve handle 7.

When either the service or the emergency brake application is released, brake pipe pressure is recharged by movement of the automatic brake valve handle to release position. This causes service portion 8 of control valve device 2 to exahust brake cylinder line 23, which in turn causes relay valve device 3 to release the brake cylinder pressure. In addition, chamber 49 is exhausted via passage 42a, one-way check valve 42b, and the exhausting brake cylinder pilot line 23 to allow spring 58 to reset dissipation valve 32 following an emergency application.

Figure 2:
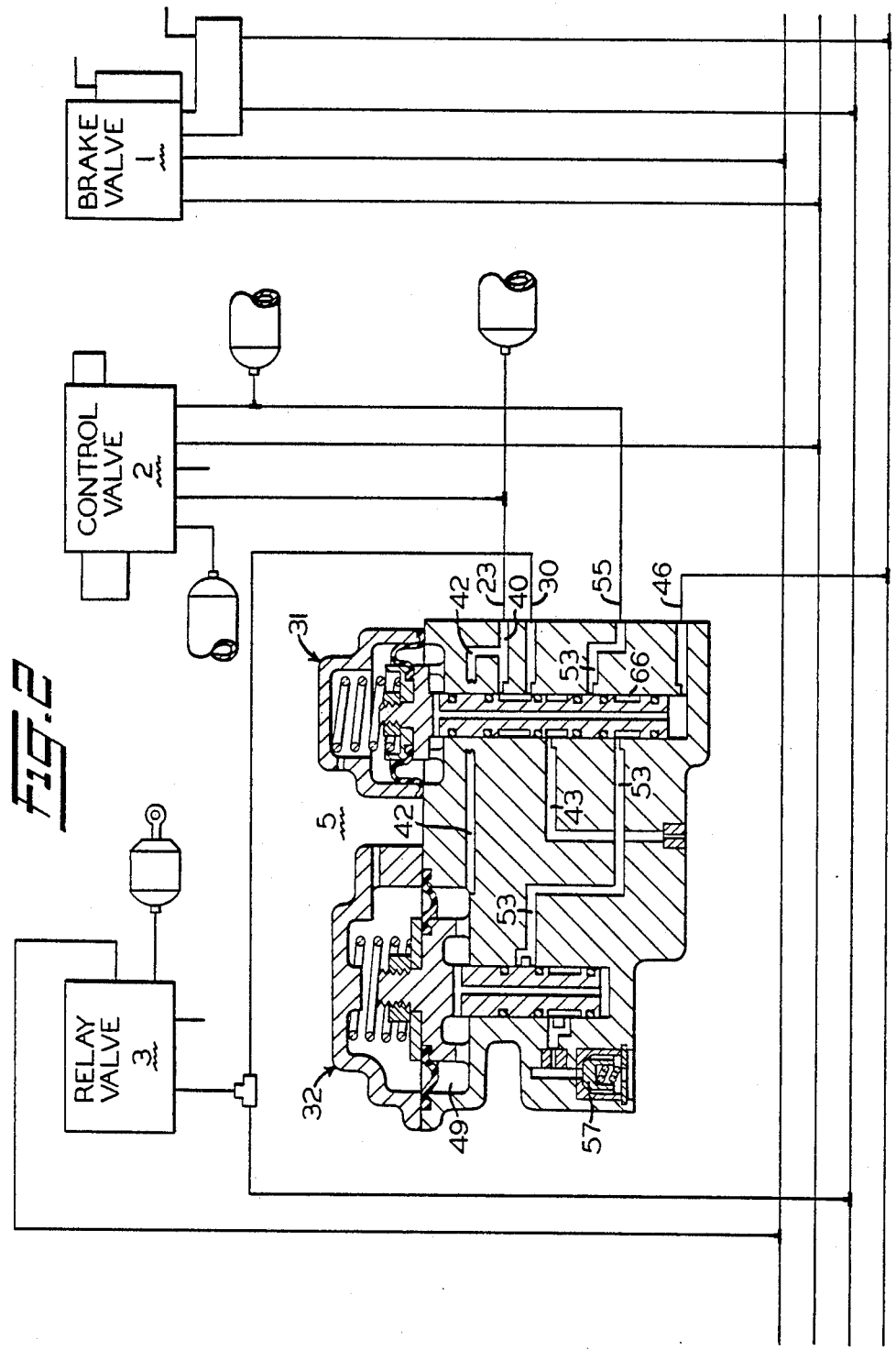
FIG. 2 is a piping schematic of a locomotive brake system, as in FIG. 1, showing an alternative embodiment of the quick release valve device.

In the alternate embodiment of the invention shown in FIG. 2, quick release valve device 5 is arranged to eliminate passage 42a and check valve 42b in FIG. 1, but requires an additional valve function to be provided by spool 36 of release valve 31. Elimination of passage 42a and check valve 42b is made possible by connecting passage 42 directly to passage 40 in bypass of the release valve spool 36, so that control chamber 49 under dissipation valve piston 47 is pressurized and depressurized in accordance with operation of control valve device 2 to supply and exhaust fluid pressure in brake cylinder pilot line 23, irrespective of the position of release valve 31. Since dissipation valve 32 is thus operated independently of release valve 31, it will be appreciated that the exhaust of auxiliary reservoir pressure at the time of a quick release operation must be controlled by the release valve 31. Thus, an additional annular groove 66 is provided in spool 36, and passage 53 connects auxiliary reservoir pressure to the spool cavity. When release valve 31 is actuated, piston 33 and spool 36 are moved upwardly such that passage 53 is interconnected via the spool groove 66 with passage 55 leading to the auxiliary reservoir. Auxiliary reservoir pressure is thus exhausted via the dissipation valve 32 and retention check valve 57 only when both the dissipation valve and the release valve are concurrently actuated. As previously explained, the resultant decrease in auxiliary reservoir pressure causes the service portion of control valve device 2 to vent line 23, which in turn vents control chamber 49 to allow the dissipation valve to reset.

Figure 3:
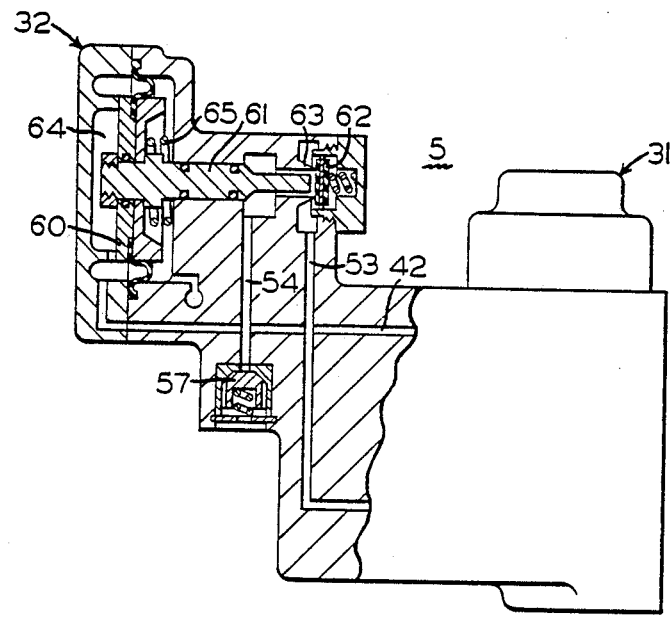
FIG. 3 shows a quick release valve device according to the embodiment of either FIG. 1 or FIG. 2 and employing a poppet-type dissipation valve instead of a spool-type dissipation valve.

In FIG. 3 is shown different version of dissipation valve 32 that can be substituted for the dissipation valve shown in either of the embodiments of FIGS. 1 and 2. In the FIG. 3 version, dissipation valve 32 employs a poppet-type valve including a diaphragm piston 60 to which is connected a stem 61 for lifting a disc valve 62 from an annular seat 63 when an actuating chamber 64 formed on one side of piston 60 is pressurized. A return spring 65 acts on the opposite side of piston 60 to urge the dissipation valve 32 to a deactuated position. The remainder of this FIG. 3 version of quick release valve 5 is the same as shown in FIGS. 1 and 2 and is piped into the respective systems of the embodiments of FIGS. 1 and 2 so as to operate in the same manner as above described. Thus, dependent upon the deactuated or actuated position of dissipation valve 32, disc valve 62 is seated or unseated, respectively, to interrupt or establish fluid pressure communication between passage 53 and passage 54 leading to retention check valve 57.

Having now described the invention, what I claim as new and desire to secure by Letters Patent, is:

1. For use in a locomotive having an automatic and an independent brake system including a brake pipe, an auxiliary reservoir charged to the pressure carried in said brake pipe, an actuating pipe, a brake valve device having an automatic brake valve handle to vary the pressure of fluid carried in said brake pipe and an independent brake valve handle to pressurize and depressurize said actuating pipe, braking means, and a control valve device operative in response to a pressure differential between said brake pipe and said auxiliary reservoir in a first sense to connect said auxiliary reservoir pressure to a brake cylinder pipe connected to said braking means to effect operation of said braking means and operative in response to a pressure differential between said brake pipe and said auxiliary reservoir in a sense opposite said first sense to exhaust said brake cylinder pipe, there is provided quick release valve means for effecting the release of a brake pressure applied through said independent brake system application without releasing brake pressure applied through said automatic brake system comprising:

(a) first valve means for interrupting fluid pressure communication between said control valve and said braking means via said brake cylinder pipe and for concurrently exhausting fluid pressure from said braking means when said actuating pipe is pressurized; and (b) second valve means for exhausting said auxiliary reservoir pressure when said actuating pipe is pressurized until the auxiliary reservoir pressure is such as to establish said pressure differential in said opposite sense.

2. A brake system, as recited in claim 1, wherein said quick release means further comprises a volume reservoir to which said auxiliary reservoir fluid under pressure is connected via said brake cylinder pipe.

3. A brake system, as recited in claim 1, wherein said quick release means further comprises means for restricting the rate of exhaust of said auxiliary reservoir fluid under pressure by said second valve means.

4. A brake system, as recited in claim 1, wherein said quick release means further comprises third valve means via which said exhaust of said auxiliary reservoir fluid under pressure is conducted for limiting said reduction of said auxiliary reservoir pressure by said second valve means.

5. A brake system, as recited in claim 1, wherein said first valve means and said second valve means each comprise a piston and a valve member connected thereto, each said piston having a return spring acting on one side of said piston in a direction to establish a deactuated position of said first and second valve means.

6. A brake system, as recited in claim 5, wherein said piston of said first valve means is subject on the side of said piston opposite said one side to fluid pressure in said actuating pipe when said actuating pipe is pressurized to thereby urge said piston and said valve member of said first valve means in a direction to establish an actuated position thereof.

7. A brake system, as recited in claim 6, wherein fluid pressure communication is established between said piston of said second valve means and said brake cylinder pipe via said valve member of said first valve means in said actuated position thereof to thereby urge said piston and said valve member of said second valve means in a direction to establish an actuated position thereof when said brake cylinder pipe is pressurized, wherein said auxiliary reservoir pressure is connected to atmosphere via said valve member of said second valve means, said piston and said valve member of said second valve means being shifted to said deactuated position by said spring when the fluid pressure in said brake cylinder pipe is exhaused, to thereby interrupt said connection of said auxiliary reservoir fluid pressure to atmosphere.

8. A brake system, as recited in claim 7 further comprising a one-way check valve via which fluid under pressure is exhausted from said piston of said second valve means when said brake cylinder pipe is exhausted.

9. A brake system, as recited in claim 7, wherein said valve member of said first and second valve means is a spool valve.

10. A brake system, as recited in claim 7, wherein said valve member of said first valve means is a spool valve and said valve member of said second valve means is a poppet valve.

11. A brake system, as recited in claim 6, wherein fluid pressure communication is established between said piston of said second valve means and said brake cylinder pipe in bypass of said valve member of said first valve means to thereby urge said piston and said valve member of said second valve means in a direction to establish an actuated position thereof when said brake cylinder pipe is pressurized, said auxiliary reservoir fluid pressure being connected to atmosphere via said valve member of said first valve means in said actuated position thereof and via said valve member of said second valve means in said actuated position thereof, said piston and said valve member of said second valve means being shifted to said deactuated position by said spring when the fluid pressure in said brake cylinder pipe is exhausted, to thereby interrupt said connection of said auxiliary reservoir fluid pressure to atmosphere.

12. A brake system, as recited in claim 11, wherein said valve member of said first and second valve means is a spool valve.

13. A brake system, as recited in claim 11, wherein said valve member of said first valve means is a spool valve and said valve member of said second valve means is a poppet valve.

* * * * *